US011971215B2

(12) United States Patent
Miller et al.

(10) Patent No.: US 11,971,215 B2
(45) Date of Patent: Apr. 30, 2024

(54) PLANT MATERIAL DRYING METHODS AND SYSTEMS

(71) Applicant: Phat Panda LLC, Spokane, WA (US)

(72) Inventors: Tyler Miller, Chattaroy, WA (US); Mojave Morelli, Spokane, WA (US)

( * ) Notice: Subject to any disclaimer, the term of this patent is extended or adjusted under 35 U.S.C. 154(b) by 430 days.

(21) Appl. No.: 17/516,218

(22) Filed: Nov. 1, 2021

(65) Prior Publication Data

US 2023/0133124 A1 May 4, 2023

(51) Int. Cl.

| | |
|---|---|
| ***F26B 25/16*** | (2006.01) |
| ***F26B 3/04*** | (2006.01) |
| ***F26B 21/08*** | (2006.01) |
| ***F26B 21/10*** | (2006.01) |

(52) U.S. Cl.

CPC ................ *F26B 25/16* (2013.01); *F26B 3/04* (2013.01); *F26B 21/08* (2013.01); *F26B 21/10* (2013.01)

(58) Field of Classification Search

CPC .. F26B 25/16; F26B 3/04; F26B 21/08; F26B 21/10

USPC ............................................................ 34/218

See application file for complete search history.

(56) References Cited

U.S. PATENT DOCUMENTS 2,000,477 A * 5/1935 Carry ................. B61D 27/0072 62/412
3,456,357 A * 7/1969 Griffith ................. F26B 25/009 34/493
5,392,846 A * 2/1995 Gardner .................. F24F 3/001 415/206
5,988,264 A * 11/1999 Goldsmith ................ F24D 3/14 165/56
6,293,121 B1 * 9/2001 Labrador .................. F03D 5/00 62/304
11,310,965 B1 * 4/2022 Miller ...................... A01G 9/18
11,384,980 B2 * 7/2022 Triglia, Jr. ............ F26B 13/008
PP35,571 P2 * 1/2024 Morelli .................... A01H 6/28 Plt./258
2011/0081241 A1 4/2011 Reuter
2014/0150287 A1 6/2014 Ahn et al.

(Continued)

FOREIGN PATENT DOCUMENTS

CN 208817875 U 5/2019
CN 210399862 U 4/2020

(Continued)

OTHER PUBLICATIONS

Joachim Muller, Drying of Non Medicinal Plants, Jan. 2006.

*Primary Examiner* — Stephen M Gravini

(74) *Attorney, Agent, or Firm* — Derek Fahey; The IP Plus Firm, PLLC

(57) ABSTRACT

A system for drying plant material comprising an enclosed space having a ceiling, a wall, an enclosed space first portion, and an enclosed space second portion. An air supply provides tempered air into the enclosed space proximate to enclosed space first portion. The system includes at least one air mover, positioned proximate to the ceiling at the enclosed space first portion, having an air mover inlet and an air mover outlet. The system further includes a duct horizontally arranged and having an elongated body, a duct open first end portion, and a duct closed second end portion. A plurality of openings is spaced apart in a predefined pattern on the elongated body. A dehumidifier is positioned proximate to the enclosed space first portion.

20 Claims, 6 Drawing Sheets

(56) References Cited

U.S. PATENT DOCUMENTS

| | | | | |
|---|---|---|---|---|
| 2015/0127116 | A1 | 5/2015 | Pringle et al. | |
| 2020/0370827 | A1 | 11/2020 | Plavnik | |
| 2023/0133124 | A1 * | 5/2023 | Miller | F26B 25/16 34/218 |

FOREIGN PATENT DOCUMENTS

| | | | | |
|---|---|---|---|---|
| DE | 3623511 | A1 | 1/1988 | |
| DE | 202017007059 | U1 | 6/2019 | |
| EP | 0060226 | A1 | 9/1982 | |
| EP | 2339908 | B1 * | 7/2014 | F24F 11/0001 |
| WO | WO-2011086279 | A1 * | 7/2011 | F24F 11/0001 |

* cited by examiner

PLANT MATERIAL DRYING METHODS AND SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present disclosure relates to the field of horticulture, and more specifically to the field of fluid dynamics in horticulture to optimize production and promote a consistent attributes of plant materials.

BACKGROUND

In order to grow prolifically, most plants require specific environmental conditions, which are often not provided by outdoor cultivation. However, indoor cultivation allows for farmers to control aspects, such as airflow, air temperature, and humidity, of a plant's environment to meet specific environment conditions. Because more farmers realize that indoor cultivation is more effective than outdoor cultivation, they are searching for effective ways to control the environment for certain commercial plants, such as mint, sage, raw cocoa, flax seed, hibiscus, tomatoes, hemp, hops, and *cannabis*. One of the most important aspects for indoor cultivation of plants is generating ideal air conditions. Indoor cultivators are constantly searching for effective ways to control the flow of tempered air within a grow room to help simulate the best weather conditions for their plants. However, existing systems of air drying for plants cause issues such as nonoptimal humidity levels, wind damage, and inconsistent temperature levels.

Humidity and temperature levels in a plant's environment can affect the growth, drying and other attributes of the plant depending on each type of plants unique growing conditions, drying conditions and the desired yield. Existing drying systems fail to provide consistently optimal levels of humidity and temperature. Nonoptimal humidity levels and inconsistent temperature can cause inconsistencies in plant material attributes such as smell, moisture levels, physical appearance, texture, size, shape and other attributes. Varying plant growth and plant material drying inhibits cultivators from achieving consistent quality in the same harvest or replicating strands of buds or flowers from previous yields.

Inconsistent moisture levels may also caused by direct air flow within existing plant drying systems which use either stationary or oscillating fans, or other types of air movers. Direct air flow on plan material during the drying process may damage plants, which may reduce the amount of buds and flowers, in a drying room and may also cause inconsistent drying and inconsistent moisture levels and other attributes for the plant material. The wind damage may also vary the quality and other attributes of the plants.

Existing plant drying systems use methods that cause the plant material to quickly over dry and lose water weight, leading to underachieving quality goals and undesirable attributes. Existing drying systems may often sometimes affect the output of the final product sold to the consumer.

As a result, there exists a need for improvements over the prior art and more particularly for a more efficient way of providing optimal fluid dynamics for drying plant material to reach ideal environmental conditions.

SUMMARY

A system and method for drying plant material is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, plant material drying systems and method are disclosed. The system includes an enclosed space having a ceiling, a wall, an enclosed space first portion, and an enclosed space second portion. An air supply provides tempered air into the enclosed space proximate to an enclosed space first portion. The system includes at least one air mover having an air mover inlet and an air mover outlet. The least one air mover is positioned proximate to the ceiling at the enclosed space first portion. The system further includes a duct horizontally arranged and having an elongated body, a duct open first end portion, and a duct closed second end portion. In one embodiment, the duct may be known as a duct sock with a closed second end. The duct open first end portion is proximate the outlet of the at least one air mover such that air moves substantially horizontally from the duct open first end portion to the duct closed second end portion. A plurality of openings is spaced apart in a predefined pattern on the elongated body allowing air into move from inside the duct to outside the duct in the enclosed space. A dehumidifier is positioned proximate to the enclosed space first portion.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein.

DETAILED DESCRIPTION

Figure 1:
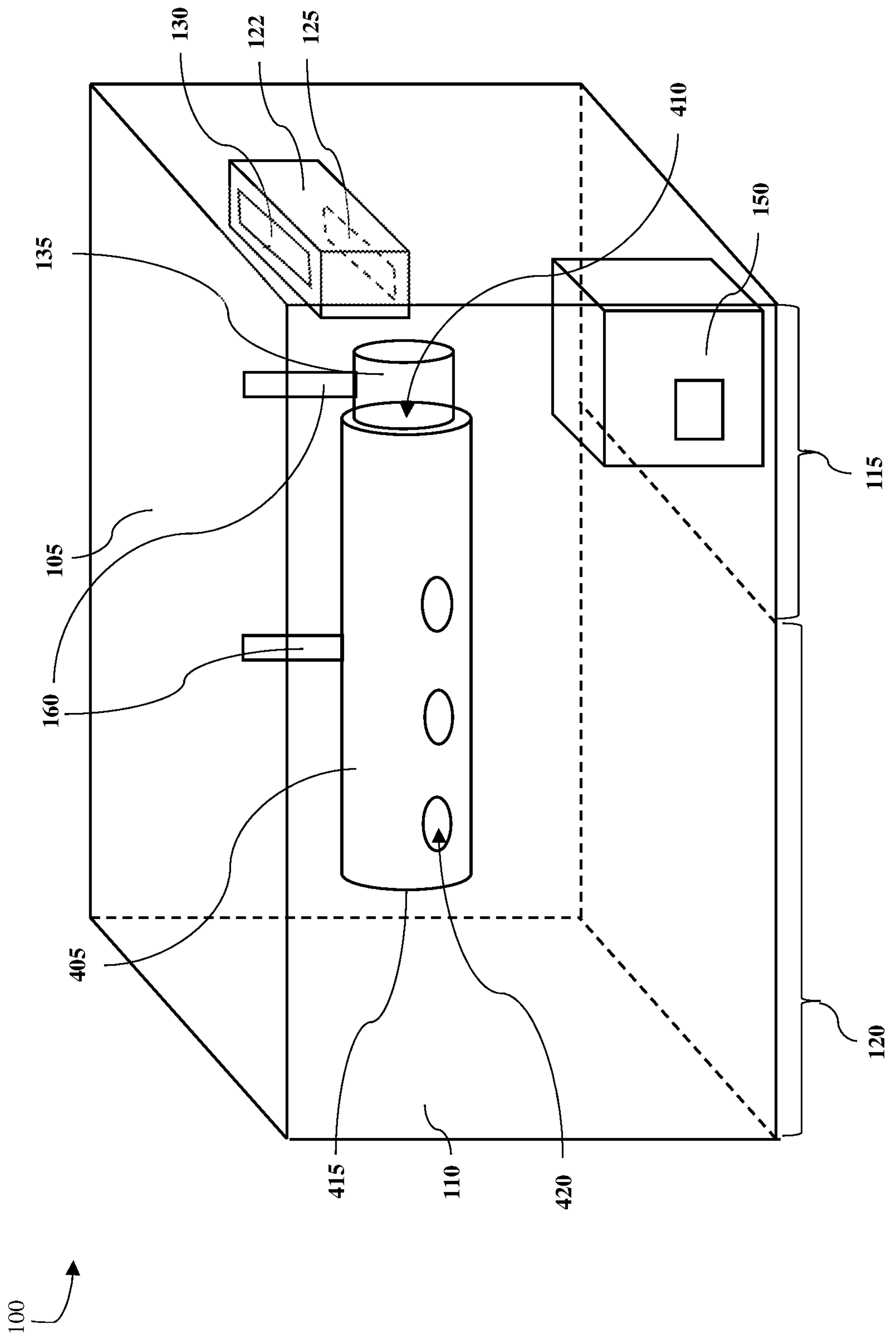
FIG. 1 is a perspective of a plant material drying system, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system that effectively dries plant material for optimal plant material attributes. The system allows for an isolated flow of consistently tempered air that avoids damaging the plant material by configuring an air supply, a duct, an air mover, and a dehumidifier in an enclosed space to efficiently control air flow and the drying process. The enclosed space includes a ceiling and a wall to help isolate the flow of air so that there is more control on the humidity and temperature of the air. The air supply provides the airflow with a controlled temperature. The duct, which receives air flow from the air mover, includes a plurality of holes in a preset pattern to also contribute to the maintenance of tempered air by evenly distributing the air from the air supply. Additionally, the plurality of holes is positioned on the duct to prevent the plants from receiving direct air flow, which effectively prevents wind damage. The dehumidifier allows the humidity in the enclosed spaced to be maintained at optimal levels for efficient plant drying and other processes.

Referring now to the Figures, FIG. 1 is a perspective of a plant material drying system 100, according to an example embodiment. The system for drying plant material includes an enclosed space having a ceiling 105, a wall 110, an enclosed space first portion 115 and an enclosed space second portion 120. In the present embodiment, the enclosed space has a plurality of walls 110; however, a single wall spanning from the floor to the ceiling may also be used and is within the spirit and scope of the present invention.

The system also includes an air supply 122 that comprises an air supply vent 125 and an air return vent 130. The air supply vent is near the bottom of the air supply and allows tempered air, which is air that is adjusted to a specific temperature, to enter the enclosed space proximate to enclosed space first portion 115. The air return vent is near the top of the air supply and retrieves air near the ceiling proximate to the enclosed space first portion. The air return vent allows the retrieved air to be recycled by the air supply to produce more tempered air. This air supply is a type of AC unit that provides better control of the temperature within the enclosed space than other styles of AC units. The system further includes at least one air mover 135 having an air mover inlet 140 and an air mover outlet 145, wherein the at least one air mover is positioned proximate to the ceiling 105 at the enclosed space first portion and close to the air supply vent. Types of air movers may include axial air movers, centrifugal air movers, and compact air movers. However, other types of air movers may be used that are within the spirit and scope of the present invention.

The system includes a duct 400 horizontally arranged and having an elongated body 405, a duct open first end portion 410, and a duct closed second end portion 415. The duct open first end portion is proximate the air mover outlet 145 of the at least one air mover such that air moves from the air supply vent, then to the air mover, then substantially horizontally from the duct open first end portion to the duct closed second end portion. The duct may be made from plastic and having flexible properties. The duct may be made from carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. However, other materials may be used that are within the spirit and scope of the present invention. The duct may be formed from a single piece or from several individual pieces joined or coupled together. The components of the duct may be manufactured from a variety of different processes including an extrusion process, a mold, welding, shearing, punching welding, folding etc. However, other types of processes may also be used and are within the spirit and scope of the present invention. In the present invention the duct may be a simple lightweight duct sock.

To receive a consistent flow of air from the air mover, the duct open first end portion 410 is in attachment with the air mover outlet 145 and proximate to the air supply vent. The duct includes a plurality of openings 420 spaced apart in a predefined pattern on the elongated body allowing air into move from inside the duct to outside the duct in the enclosed space. The pattern of the openings may be adjusted subject to the conditions further described below.

A dehumidifier 150 is positioned proximate to the enclosed space first portion. The system maintains a drying space 155 within the enclosed space, wherein the drying space comprises between 60-68 degrees Fahrenheit and between 58-62 relative humidity. The dehumidifier intakes air from the enclosed space, removes moisture from the received air, and exhausts the received with a lower water content back into the enclosed space. Types of dehumidifiers may include absorption dehumidifiers or refrigeration dehumidifiers. Absorption dehumidifiers allow air to pass through desiccant material to absorb water from the air. At least one fastener 160 attaches the duct to the ceiling 105. The fastener may include hooks, brackets, bolt, set crews, opening configured to attached to protruding element, socket screws, u-bolts, twine, etc. However, other types of fasteners may also be used and are within the spirit and scope of the present invention.

The enclosed space includes the ceiling 105 and the wall 110 to define the dimensions of the enclosed space. The enclosed space helps control the plants' environment and maintain temperature and humidity levels by providing more isolation to the system of air flow. The enclosed space also includes the enclosed space first portion and the enclosed space second portion. The enclose space first end portion includes the air supply, air mover, and dehumidifier. The enclosed space second portion may comprise the part of the duct 400 that includes the plurality of openings 420.

In the present embodiment, the air supply 122 may be a ductless split system that uses an outdoor unit containing a condenser and compressor and a wall-mounted AC unit installed indoors. The outdoor unit provides refrigerant, which is a cooling fluid, via tubing to the indoor AC unit such that the refrigerant helps the AC unit temper the air. The AC unit is a wall-mounted AC unit, which is usually attached to a wall near the near ceiling. The AC unit does not have extra parts or ducts that retrieve or exhaust air outside a room. The wall-mounted AC unit includes a vent near the bottom of the AC unit that supplies tempered air to enter the room. The AC unit also includes a vent near the top of the unit to retrieve un-tempered air that tends to rise to the top of a room. This upper vent allows the AC unit to recycle un-tempered air within a room for the AC unit to produce tempered air. Other AC unit systems, such as stand-alone or multi-split systems, that provide tempered air to the enclosed space are within the spirit and scope of the present invention.

The air supply vent 125 of the air supply 122 provides tempered air into the enclosed space proximate the enclosed space first portion. The air supply is configured to provide air with a temperature that consistently maintains the required temperature of the drying space 155.

The air return vent 130 of the air supply 122 retrieves air from the enclosed space first portion to be recycled by the air supply. The air return vent is above the air supply to recycle the air that has lost its original temperature because hot air tends to rise. The air return vent includes an air return sensor 165 that tracks the temperature of the enclosed space to help the air supply calculate the required temperature for the tempered air. The sensor facilitates temperature of air being provided by the air supply vent 125 to help maintain the temperature of the drying space.

The air mover 135 includes the air mover inlet and the air mover outlet. The air mover inlet faces the air supply 122 while the air mover outlet faces the duct such that the air is flowing towards the duct. The air mover transfers the tempered air from the enclosed space first portion into the duct for the duct to distribute throughout the room. In one embodiment, the air mover may be a can fan attached to the ceiling via fastener 160. The fastener may include hooks, brackets, bolt, set crews, opening configured to attached to protruding element, socket screws, u-bolts, twine, etc. However, other types of fasteners may also be used and are within the spirit and scope of the present invention.

The duct 400 guides the flow of tempered air from the air mover in a substantially horizontal direction and distributes the air from the duct open first end to the duct closed second end. The duct closed second end allows the duct to build pressure such that the tempered air is forced out of the plurality of openings. The plurality of openings 420 is positioned in a predefined pattern configured to evenly distribute tempered air into the enclosed space. The predefined pattern is configured to avoid damage to the plant material in the drying area by flowing the air in directly downward angles such that the air is not flowing directly into the plant material. The positioning of the plurality of openings also allows the flow of tempered air to avoid hitting the ceiling and creating deadhead thereby maintaining the temperature in the flow of tempered air. The plurality of holes is spaced apart at a predefined distance along the length of the drying area within the enclosed space second portion. The duct may include polymeric materials such as polyethylene, including high density polyethylene, low density polyethylene, linear low density polyethylene, medium density polyethylene, or polypropylene. The duct may be made of other materials and is within the spirit and the disclosure. The duct may be formed from a single piece or from several individual pieces joined or coupled together. The components of the duct may be manufactured from a variety of different processes including a polymerization process, polycondensation process, etc. However, other types of processes may also be used and are within the spirit and scope of the present invention.

The dehumidifier 150 comprises a dehumidifier inlet 170, dehumidifier outlet 175, and dehumidifier sensor 180. The dehumidifier inlet retrieves air from the enclosed space proximate to the enclosed space first portion 115 to filter out a certain amount of humidity. The dehumidifier helps maintain the required range of humidity levels in the drying space. The dehumidifier outlet exhausts the filtered air back into the enclosed space proximate to the enclosed space first portion. The dehumidifier sensor tracks the relative humidity of the air in the enclosed space. The dehumidifier is configured to remove a certain amount of humidity depending on the humidifier sensor such that the optimal level of humidity is maintained in the enclosed space. The dehumidifier aims to keep the humidity level of the air in the enclosed space around 58-60 relative humidity. This level of humidity is ideal for the drying of the plant material in the drying space 155. The dehumidifier may remove 205 pints of water per day. However, other embodiments may be used and are within the spirit and scope of the present invention.

The fastener 160 may include a hook, bolt, opening configured to attached to protruding element, u-bolts, etc. However, other types of fasteners may also be used and are within the spirit and scope of the present invention. The fastener attaches the duct to the ceiling so that the duct may flow air into the drying area.

Figure 2:
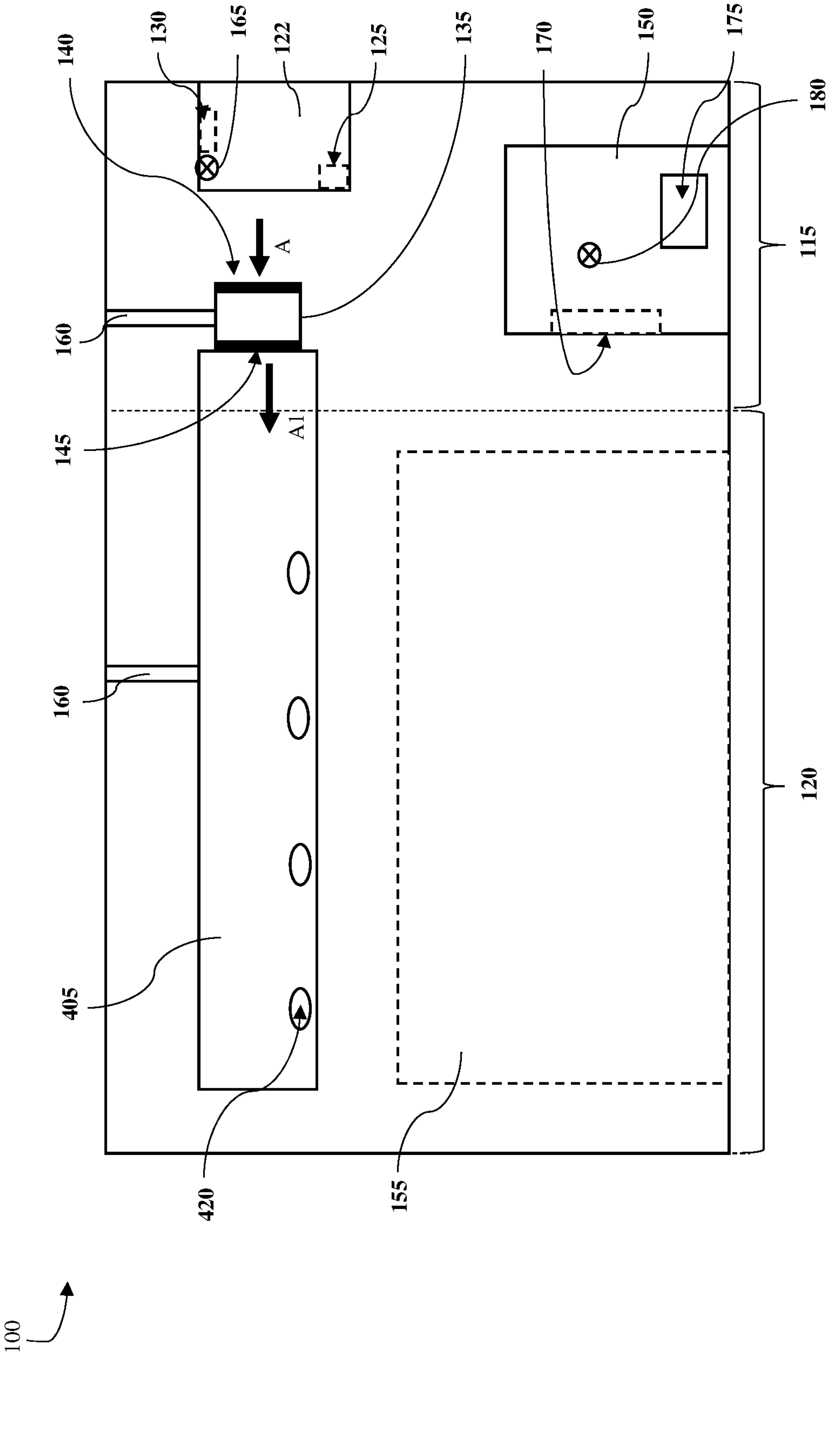
FIG. 2 is a side view of the plant material drying system, according to an example embodiment.

Referring now to FIG. 2, a side view of the plant material drying system 100 is shown, according to an example embodiment. The system for drying plant material comprises an enclosed space having a ceiling 105, a wall 110, an enclosed space first portion 115 and an enclosed space second portion 120. An air supply 122 provides tempered air into the enclosed space proximate to enclosed space first portion. At least one air mover 135 having an air mover inlet 140 and an air mover outlet 145 is positioned proximate to the ceiling at the enclosed space first portion. The system further comprises a duct 400 horizontally arranged and having an elongated body 405, a duct open first end portion 410 and a duct closed second end portion 415. The duct open first end portion is proximate to the air mover outlet 145 of at least one air mover 135 such that air moves substantially horizontally from the duct open first end portion to the duct closed second end portion. A plurality of openings 420 is spaced apart in a predefined pattern on the elongated body 405 allowing air into move from inside the duct to outside the duct in the enclosed space. A dehumidifier 150 is positioned proximate to the enclosed space first portion. The system also includes a drying space 155 within the enclosed space, wherein the drying space comprises between 60-68 degrees Fahrenheit and between 58-62 relative humidity.

The air mover transfers the air from the enclosed space proximate to the enclosed space first portion 115 in a substantially horizontal direction towards the enclosed space second portion 120 or drying area. The air moves into the air mover inlet 140 in the A direction and out of the air mover outlet 145 in the A1 direction. In the same direction, the air flows into the duct to be dispersed into the drying space 155.

The drying space 155 is under the duct and proximate to the enclosed space second portion. The drying space includes the plant material needing to be dried. The term "plant material" used in this application may include any combination of mint, sage, raw cocoa, flax seed, hibiscus, tomatoes, hemp, hops, and *cannabis*. However, other types of plants, flowers and organic material may be used within the spirit and scope of the present invention. The drying space is under the duct because the duct releases tempered air through the plurality of openings 420, which is positioned in a predefined pattern to release air. The predefined pattern includes a row of circular cutouts on each side of the vertical midline of a traverse cross-section of the duct and positioned 30 degrees below the horizontal midline of said traverse cross-section of the duct. Positioning the openings below the horizontal midline directs airflow away from the walls and ceiling to prevent deadhead and changes in temperature. This predefined pattern is also configured to avoid damage to the plant material by flowing the air at a downwards angle to create the drying space around the plants instead of directly flowing the air into the plants. Because the duct is enclosed, the air pressure increases within the duct to allow air inside the duct to be released at an increased velocity. The air in the drying space comprises temperatures between 60 and 68 degrees Fahrenheit and humidity levels between 58 and 62 relative humidity. These ranges of temperature and humidity level are considered to be optimal conditions for the drying or moisture removal of the plant material within the drying space. These conditions avoid over drying the plant material such that the plant material holds a favorable water weight for effective plant drying.

Figure 3:
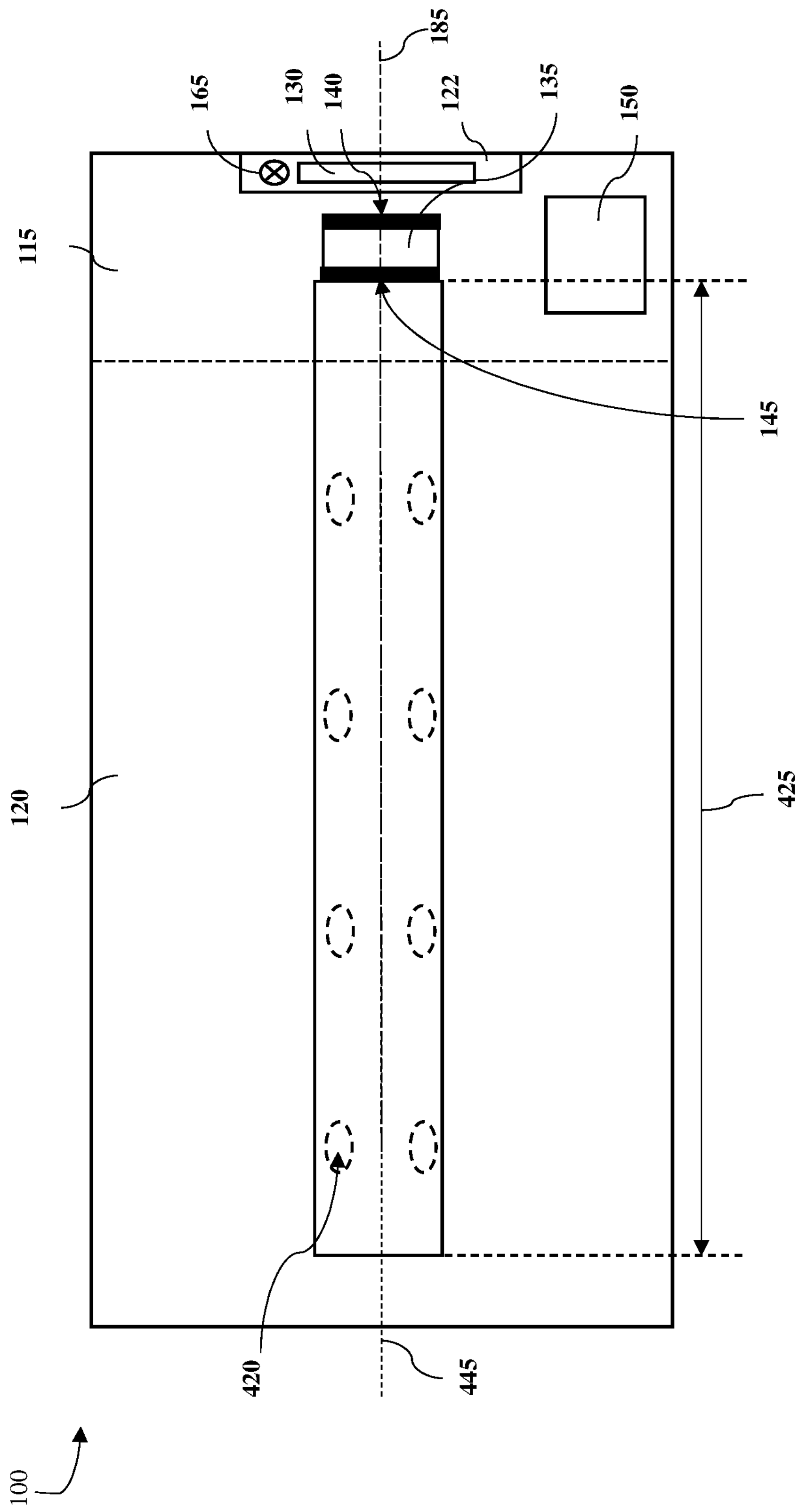
FIG. 3 is a top view of the plant material drying system, according to an example embodiment.

Referring now to FIG. 3, a top view of the plant material drying system 100 is shown, according to an example embodiment. The system for drying plant material comprises an enclosed space. An air supply 122 having an air supply vent 125 and air return vent 130 provides tempered air into the enclosed space. At least one air mover 135 having an air mover inlet 140 and an air mover outlet 145. The system further comprises a duct 400 horizontally arranged and having an elongated body 405, a duct open first end portion 410, and a duct closed second end portion 415. The horizontal arrangement allows the duct to span parallel to the dimensional plane of the ceiling. In the present embodiment, the at least one air mover and the elongated body of the duct may be substantially centered along an enclosed space midline 185, which represents a horizontal line that spans through the middle of the enclosed space. The air mover may also be positioned in front of the air supply vent to receive freshly tempered air. The duct open first end portion is in attachment to the outlet of the at least one air mover such that air moves substantially horizontally from the duct open first end portion to the duct closed second end portion. A plurality of openings 420 spaced apart in a predefined pattern on the elongated body allowing air to move from inside the duct to outside the duct in the enclosed space. The system also includes a dehumidifier 150, which has a dehumidifier inlet 170 and dehumidifier outlet 175, that removes a certain amount of humidity from the enclosed space. The elongated body 405 of the duct has a length 425 that spans a substantial portion of the enclosed space. The elongated body of the duct may have a length that is longer than the drying space but shorter than the length of the enclosed space. This allows the plurality of holes to distribute the tempered air throughout all the drying space.

The air return vent 130 is proximate to the top of the enclosed space first portion 115 because some of the tempered air may increase in temperature when hitting the wall or ceiling of the enclosed space. The increase in temperature may cause the air to rise and be recycled by the air supply 122 such that the air supply can provide more tempered air. Recycling the air in the enclosed space allows the drying space to maintain the consistent range of temperature needed for the plant material.

Figure 4A:
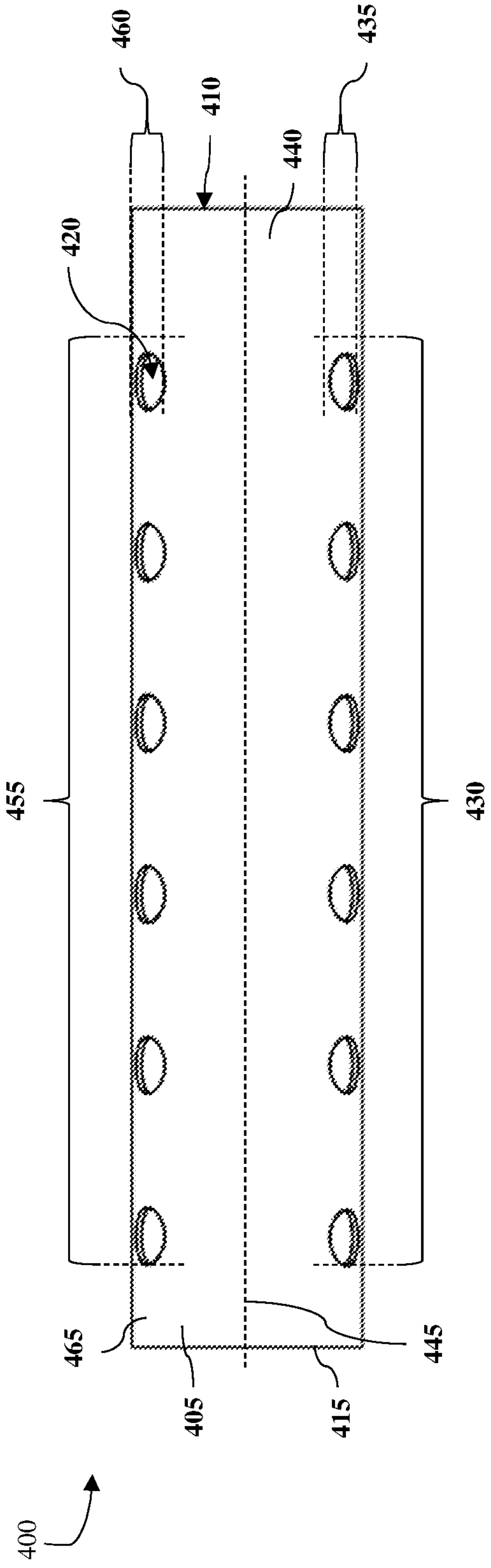
FIG. 4A is a bottom view of an elongated body of a duct, according to an example embodiment.
Figure 4B:
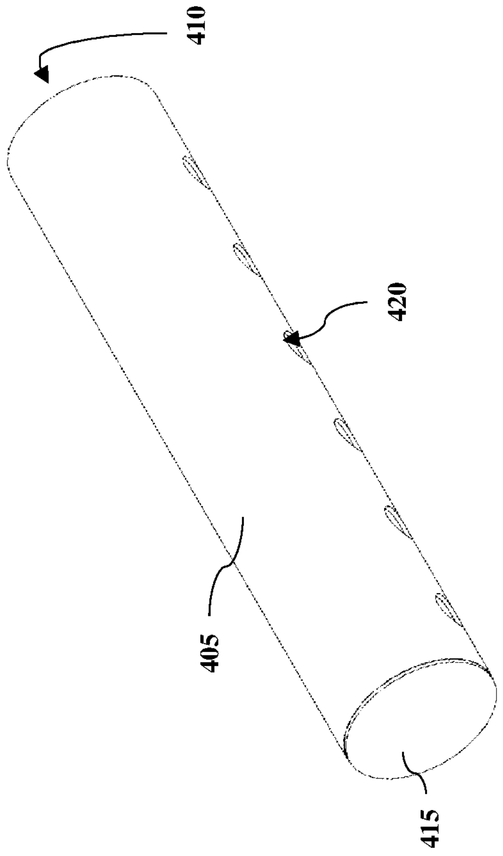
FIG. 4B is a perspective of the elongated body of the duct, according to an example embodiment.

Referring now to FIGS. 4A and 4B, the duct 400 having an elongated body, a duct open first end portion 410, and duct closed second end portion 415 is shown, according to an example embodiment. FIG. 4A is a bottom view of an elongated body 405 of a duct, according to an example embodiment. FIG. 4B is a perspective view of the elongated body of the duct, according to an example embodiment. A first portion 430 plurality of openings is arranged in a first row 435 on a first side 440 of a vertical midline 445 of a traverse cross-section 450 of the duct; A second portion 455 of the plurality of openings is arranged in a second row 460 on a second side 465 of the vertical midline. Adjacent openings 420 of the plurality of openings of the first row are at least 14-20 inches spaced apart and wherein second adjacent openings of the plurality of openings of the second row are at least 14-20 inches spaced apart. Adjacent openings are those that are directly next to another opening relative to one side of the vertical line.

The duct open first end portion 410 allows the duct to receive a flow of tempered air from the air mover 135 supply vent such that the tempered air travels to the closed second end portion. The close second end portion causes air pressure to build up within the duct thereby forcing the tempered air to travel through the plurality of openings 420 and into the drying space 155.

The vertical midline 445 represents a line that intersects the center point of the traverse cross-section of the duct and is perpendicular to the ceiling when the duct is in attachment with the air mover. The first side 440 includes the first portion 430 plurality of openings that are arranged in the first row 435, which oriented in a horizontal line along the edge of the duct. The second row 460 of the second portion 455 plurality of openings are positioned at an angle from the vertical midline such that the second side looks mirrored to the first side.

The dimensions of the openings 420 and the spaces between the openings are configured to provide the drying space 155 with a flow of tempered air that is optimal for drying. These dimensions allow for the velocity of air flow to be fitting for the plant material in the drying space. The velocity includes a speed and direction that prevents direct airflow onto the plant material and into the ceiling and wall thereby preventing wind damage to the plant material and deadhead. The direction of the airflow must be angled 30 degrees below the plane of the ceiling to prevent deadhead. The velocity provides a drying space to surrounds the plant material with air that has adjusted temperature and humidity levels. The air's velocity and levels of humidity and temperature prevents the plants material from over drying and losing too much moisture. While an optimal amount of water weight for the plant material attributes, it is necessary for the plants to lose moisture in order to prevent pathogens and pests and also to maintain certain plant attributes such as color, texture, smell, and other certain attributes.

Figure 5B:
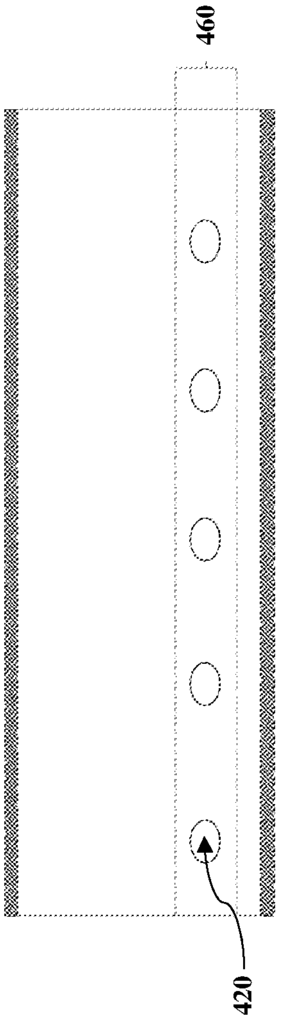
FIG. 5B is a cross-sectional view of the elongated body of the duct, according to an example embodiment.
Figure 5A:
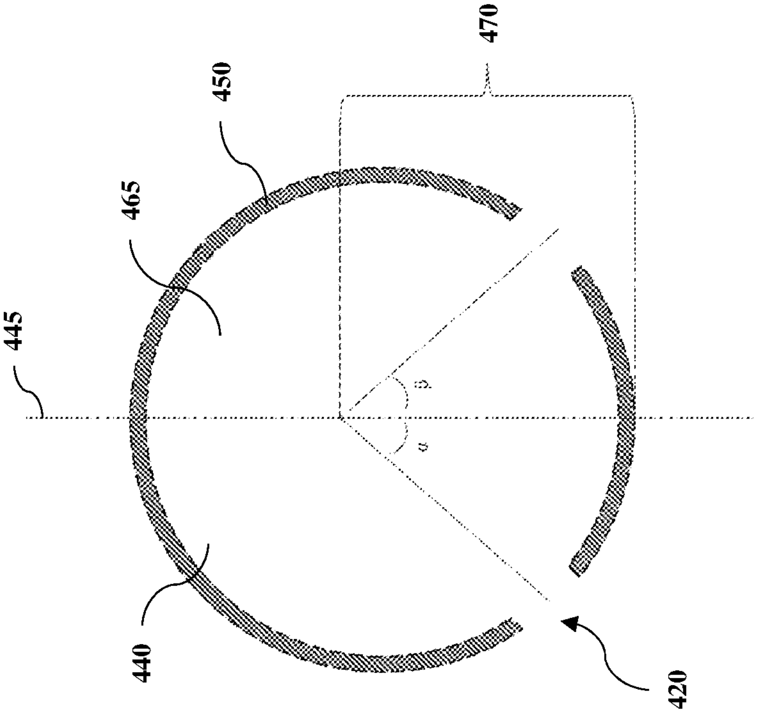
FIG. 5A is a cross-sectional view of the elongated body of the duct, according to an example embodiment.

Referring now to FIGS. 5A and 5B, cross-sectional views of the elongated body 405 of the duct 400 are shown, according to an example embodiment. FIG. 5A a cross-sectional view of the elongated body of the duct, according to an example embodiment. FIG. 5B is a cross-sectional view of the elongated body of the duct, according to an example embodiment. A first portion 430 plurality of openings is arranged in a first row 435 on a first side 440 of a vertical midline 445 of a traverse cross-section 450 of the duct. A second portion 455 of the plurality of openings is arranged in a second row 460 on a second side 465 of the vertical midline. The first row is disposed on a lower side 470 of the duct between 10 and 90 degrees from the vertical midline.

The first portion 430 of the plurality of openings is positioned at angle β from the vertical midline on the lower side of the duct. The second portion 455 of the plurality of openings is positioned at angle α from the vertical midline. Both angles are set to 60 degrees to position the first row and the second row at 4 o'clock and 8 o'clock on the traverse cross-section. These angles allow for airflow that moves way from the ceiling to prevent dead head. The angles flow the air downwards to create the drying space around the plant material and to prevent direct airflow onto the plant materials. The first row 435 and the second row 460 are arranged in horizontal lines parallel to each other to achieve even distribution of tempered air.

Adjacent openings of the plurality of openings 420 of the first row 435 are at least 14-20 inches spaced apart and wherein second adjacent openings of the plurality of openings of the second row 460 are at least 14-20 inches spaced apart. The diameter of each opening may be 2 inches. The spacings between adjacent holes and the diameters of each hole are configured to provide a strategically distributed flow of tempered air to the plant material. This flow of air will allow the plant material to receive a steady supply optimal temperatures and humidity levels such that the plant material is not overdried and maintains a healthy water weight.

Figure 6:
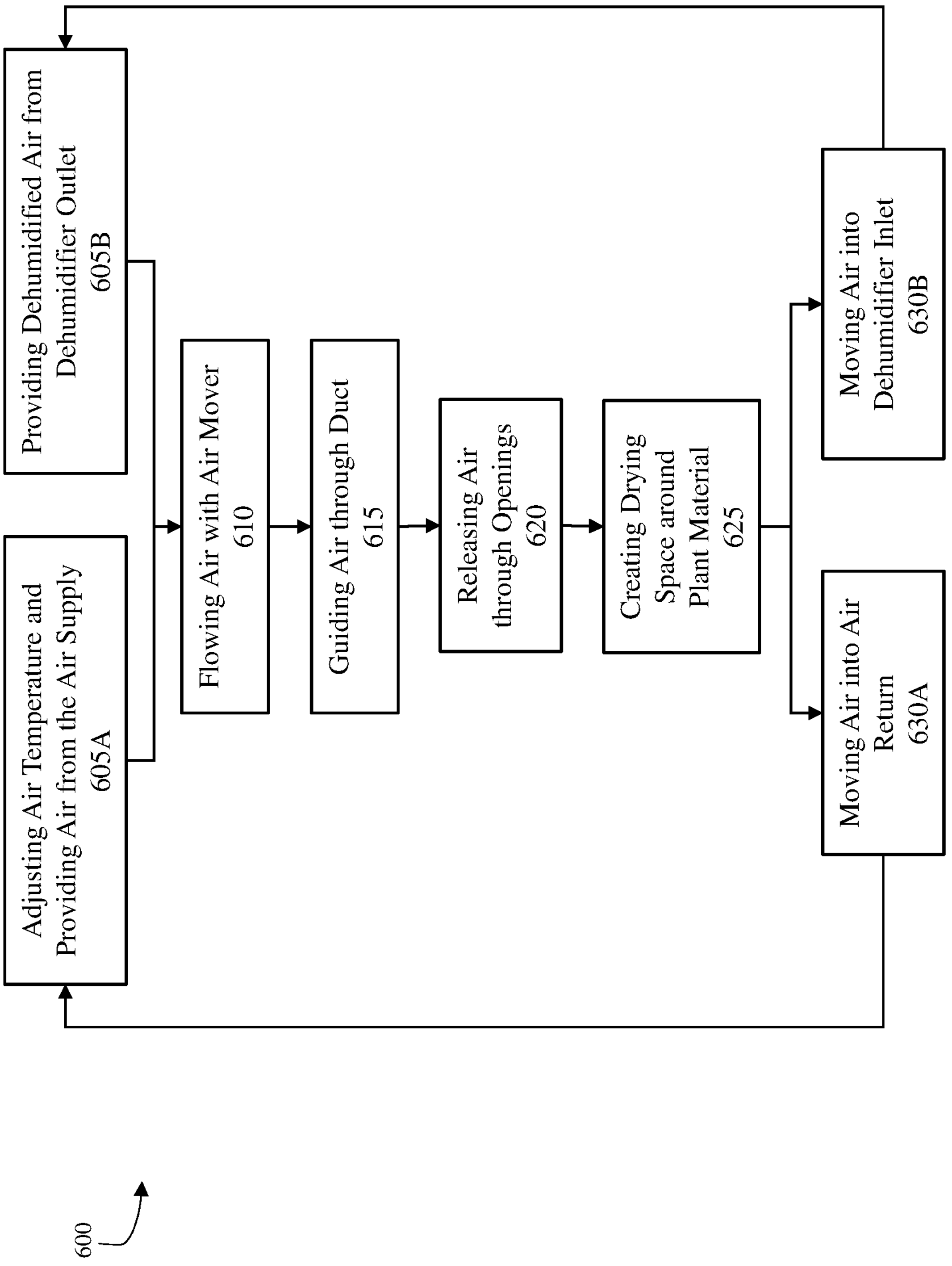
FIG. 6 is a block diagram illustrating a method of providing air flow to promote plant material drying and air purification, according to an example embodiment.

Referring now to FIG. 6, a block diagram illustrating a method 600 of providing air flow to promote plant material drying and air purification is shown, according to an example embodiment. At step 605A, the air supply 122 adjusts the temperature of the air and supplies that tempered air via air supply vent 125 into the enclosed space first portion. At step 605B, the dehumidifier outlet 175 provides air with an adjusted level of water content into the enclosed space first portion. Both the air supply and the dehumidifier set the range of temperature and humidity levels needed in the drying space. The air mover 135 flows air into the duct at step 610. The air mover inlet 140 receives the air from the enclosed spaced first portion such that a flow of air into the duct 400 is provided by the air mover outlet 145. At step 615, the elongated body 405 of the duct horizontally guides the tempered air. The flow of air from the air mover outlet travels from the duct open first end portion 410 to the duct closed second end portion 415. After the increase in air pressure in the enclosed duct, the airflow is forced out of the plurality of openings 420 at step 620. At step 625, the airflow from the predefined pattern of the openings creates the drying space 155 around the plant material. The openings of the duct flow air out in two downward angles such that the airflow avoids hitting the wall and ceiling while preventing direct flow into the plants. The two angles allow the flow of air to surround the plant material without any damage or dead head. At step 630A, the air return vent 130 retrieves air from the enclosed space first portion to be reused by the air supply. The air return sensor 165 helps the air supply determine the temperature of the provided air in step 605A. At step 630B, the dehumidifier inlet 170 receives air from the enclosed space for the dehumidifier to remove a certain amount of water from the air depending on the dehumidifier sensor 180. It is understood that this method is a continuous cycle and that each step of method 600 may operate concurrently with another step of method 600 to provide a continuous movement and introduction of tempered and dehumidified air within the system. In other embodiments, the method may further include additional steps to promote plant drying or moisture removal consistent with the systems disclosed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A system for drying plant material comprising:

a. an enclosed space having a ceiling, a wall, an enclosed space first portion and an enclosed space second portion;

b. an air supply providing tempered air into the enclosed space proximate to the enclosed space first portion;

c. at least one air mover having an air mover inlet and an air mover outlet, wherein the at least one air mover is positioned proximate to the ceiling at the enclosed space first portion;

d. a duct horizontally arranged and having an elongated body, a duct open first end portion and a duct closed second end portion;

e. wherein the duct open first end portion is proximate to the air mover outlet such that the tempered air moves substantially horizontally from the duct open first end portion to the duct closed second end portion;

f. a plurality of openings spaced apart in a predefined pattern on the elongated body allowing the tempered air to move from inside the duct to outside the duct in the enclosed space; and g. a dehumidifier positioned proximate to the enclosed space first portion.

2. The system of claim 1, wherein the system further comprises:

a. a first portion of the plurality of openings are arranged in a first row on a first side of a vertical midline of a traverse cross-section of the duct; and b. a second portion of the plurality of openings are arranged in a second row on a second side of the vertical midline.

3. The system of claim 2, wherein the first row is disposed on a lower side of the duct between 10 and 90 degrees from the vertical midline.

4. The system of claim 1, wherein the elongated body of the duct has a length that spans a substantial portion of the enclosed space.

5. The system of claim 1, wherein the system maintains a drying space within the enclosed space, wherein the drying space comprises:

a. between 60-68 degrees Fahrenheit; and b. between 58-62 relative humidity.

6. The system of claim 1, wherein at least one fastener attaches the duct to the ceiling.

7. The system of claim 1, wherein adjacent openings of the plurality of openings of a first row are at least 14-20 inches spaced apart and wherein second adjacent openings of the plurality of openings of a second row are at least 14-20 inches spaced apart.

8. A system for drying plant material comprising:

a. an enclosed space having a ceiling, a wall, an enclosed space first portion and an enclosed space second portion;

b. an air supply providing tempered air into the enclosed space proximate to the enclosed space first portion;

c. at least one air mover having an air mover inlet and an air mover outlet, wherein the at least one air mover is positioned proximate to the ceiling at the enclosed space first portion;

d. a duct horizontally arranged and having an elongated body, a duct open first end portion and a duct closed second end portion;

e. wherein the duct open first end portion is proximate to the air mover outlet such that the tempered air moves substantially horizontally from the duct open first end portion to the duct closed second end portion;

f. a plurality of openings spaced apart in a predefined pattern on the elongated body allowing the tempered air to move from inside the duct to outside the duct in the enclosed space;

g. a dehumidifier positioned proximate to the enclosed space first portion; and h. a drying space within the enclosed space, wherein the drying space comprises (i) between 60-68 degrees Fahrenheit and (ii) between 58-62 relative humidity.

9. The system of claim 8, wherein the system further comprises:

a. a first portion of the plurality of openings are arranged in a first row on a first side of a vertical midline of a traverse cross-section of the duct; and b. a second portion of the plurality of openings are arranged in a second row on a second side of the vertical midline.

10. The system of claim 9, wherein the first row is disposed on a lower side of the duct between 10 and 90 degrees from the vertical midline.

11. The system of claim 10, wherein the elongated body of the duct has a length that spans a substantial portion of the enclosed space.

12. The system of claim 11, wherein at least one fastener attaches the duct to the ceiling.

13. The system of claim 12, wherein adjacent openings of the plurality of openings of the first row are at least 14-20 inches spaced apart and wherein second adjacent openings of the plurality of openings of the second row are at least 14-20 inches spaced apart.

14. A system for drying plant material comprising:

a. an enclosed space;

b. an air supply providing tempered air into the enclosed space;

c. at least one air mover having an air mover inlet and an air mover outlet;

d. a duct horizontally arranged and having an elongated body, a duct open first end portion and a duct closed second end portion;

e. wherein the duct open first end portion is proximate to the air mover outlet such that the tempered air moves substantially horizontally from the duct open first end portion to the duct closed second end portion;

f. a plurality of openings spaced apart in a predefined pattern on the elongated body allowing the tempered air to move from inside the duct to outside the duct in the enclosed space; and g. a dehumidifier.

15. The system of claim 14, wherein the system further comprises:

a. a first portion of the plurality of openings are arranged in a first row on a first side of a vertical midline of a traverse cross-section of the duct; and b. a second portion of the plurality of openings are arranged in a second row on a second side of the vertical midline.

16. The system of claim 15, wherein the first row is disposed on a lower side of the duct between 10 and 90 degrees from the vertical midline.

17. The system of claim 14, wherein the elongated body of the duct has a length that spans a substantial portion of the enclosed space.

18. The system of claim 14, wherein the system maintains a drying space within the enclosed space, wherein the drying space comprises:

a. between 60-68 degrees Fahrenheit; and b. between 58-62 relative humidity.

19. The system of claim 14, wherein at least one fastener attaches the duct to a ceiling of the enclosed space.

20. The system of claim 14, wherein adjacent openings of the plurality of openings of a first row are at least 14-20 inches spaced apart and wherein second adjacent openings of the plurality of openings of a second row are at least 14-20 inches spaced apart.

* * * * *